April 17, 1951     J. W. ROBINS     2,549,011
CONTROL POINT SETTING AND INDICATING ADJUSTMENT
MEANS FOR PNEUMATIC CONTROLLERS
Filed Nov. 5, 1947
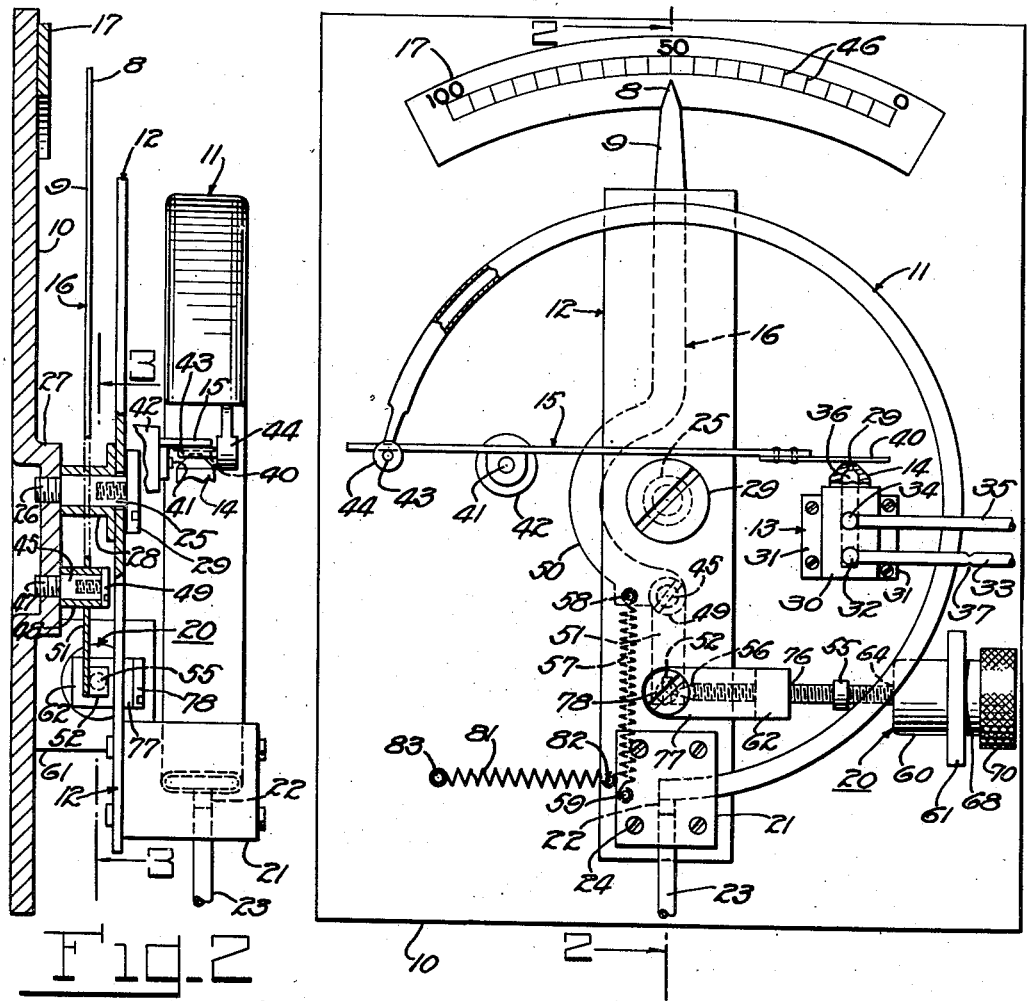
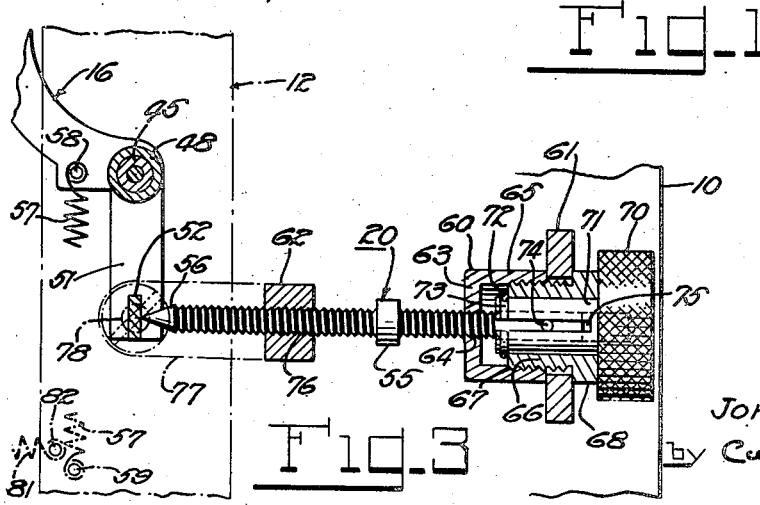
INVENTOR:
JOHN W. ROBINS Patented Apr. 17, 1951

2,549,011

UNITED STATES PATENT OFFICE 2,549,011

CONTROL POINT SETTING AND INDICATING ADJUSTMENT MEANS FOR PNEUMATIC CONTROLLERS

John W. Robins, Westwood, Mass., assignor to Mason-Neilan Regulator Company, Boston, Mass., a voluntary association of Massachusetts Application November 5, 1947, Serial No. 784,279

7 Claims. (Cl. 73—415)

This invention relates to pneumatic controllers which are responsive to changes in the value of a condition, such as temperature or pressure, and function to vary an operating pressure on a fluid actuated valve or like means for effecting a change in the value of the condition for the purpose of restoring it to normal.

Controllers of the type to which this invention relates include an element, commonly in the form of a bellows or Bourdon tube, which functions together with a sensitive valve means, as for example a nozzle and flapper, to vary the output pressure of the controller on a basis which is substantially proportional to changes in the value of the condition under control. As is well known to those skilled in the art, each Bourdon tube or bellows element has a definite operating range, and therefore it is customary to select an element having a range which is best suited to the over-all range of the condition under control. In this connection, it becomes necessary to provide means for establishing a control point setting at a selected value within this range, and in conjunction therewith, to provide means for indicating the value at which the control point is established.

In controllers to which this invention relates, wherein a Bourdon tube or bellows element is utilized, the over-all movement obtainable at the free end of the Bourdon tube or bellows is limited, in practice, on the order of ¼". On the other hand, means for indicating the adjustment, as by an indicator which cooperates with a suitable scale, requires relatively large movements since the indicia on the scale must have sufficient spacing to permit the setting to be readily visualized and accurately obtained. Therefore it becomes necessary to provide means for effecting minute control setting motions which do not permit the introduction of any substantial error such as may be occasioned by lost motion, hysteresis and the like, in combination with means for providing relatively large indication motions which accurately conform to the infinitesimal control setting movements, in themselves so small as not to be visualized. Accordingly it is an object of this invention to provide a control mechanism including control point and indicating adjustment means which afford an extremely accurate control setting at any selected value within the operating range of the instrument and which is convenient to operate and of inexpensive construction.

Fig. 1 is a front elevation of a control mechanism embodying my invention;

Fig. 2 is an end elevation partly in section on the line 2—2 of Fig. 1; and

Fig. 3 is a section taken on the line 3—3 of Fig. 2.

Having reference to the drawings, the control mechanism illustrated is of the so-called off-and-on type wherein no feed-back element, such as a bellows responsive to output pressure, is employed to provide the controller with a proportioning band, since a feed-back mechanism of any usual form may be used without effecting the operation of the device.

In reference to the drawings, I have shown the control mechanism mounted on the usual back plate 10 for supporting the assembly in an instrument case, not shown. The assembly in general comprises a condition value sensitive element which, as herein shown, is in the form of a Bourdon tube 11, a support plate 12 for the Bourdon tube, a nozzle block 13 carrying a nozzle 14, a flapper 15 in operative connection with the Bourdon tube and arranged to cooperate with the nozzle, an indicator 16 which is adapted to coact with a scale 17, and a control point setting and indication adjustment means, generally indicated at 20.

The Bourdon tube 11 is secured at one end to a mounting block 21 and is in fluid communication by means of a port 22, shown in dotted lines in Fig. 1, with a flexible pipe 23. It will be understood that the flexible pipe 23 may constitute part of a thermal system, should the condition under control be temperature, or may serve to transmit changes in pressure from a pressure system, in the event that the controller is applied to that type of condition. The block 21 is mounted at one end of the support plate 12 to which it may be secured by screws 24, and the support plate is in turn mounted on the back plate 10 by means of a pivotal connection 25. As herein shown, the pivotal connection consists of a post 26 which is threaded into a boss 27 on the back plate 10 and carries a sleeve 28, rotatably mounted thereon, to which the support plate 12 is rigidly secured. The post 26 extends through a suitable opening in the support plate 12 and carries a cap screw 29 having a head portion which extends beyond the sides of the opening and is sufficiently spaced from the support plate to permit the plate to rotate freely and to prevent any substantial movement of the sleeve 28 along the post axis.

The nozzle block 13 may be of any usual construction. As herein shown, the block comprises a body portion 30 having flanges 31 for attachment to a suitable boss, not shown, on the back plate 10. The body portion 30 is provided with a connection 32 which is in fluid communication through a pipe 33 with a supply of regulated fluid pressure from a source, not shown. The body portion is also provided with an output pressure connection 34 which may connect through a pipe 35 with the diaphragm chamber of a valve or equivalent device, also not shown, for effecting changes in the value of the condition under control. The nozzle 14, having the usual orifice 29, is secured at one end of the body portion 30, a central passage 36 being disposed in the nozzle and body portion and arranged to communicate with each of the connections 32 and 34. The supply pipe 33 may be provided with a restriction 37 having less capacity than the orifice 29 of the nozzle so that when the flow through the nozzle is throttled, as by the flapper 15, the output pressure in the pipe is governed by the relative position of the flapper in respect to the nozzle.

In order to vary the output pressure in the pipe 35 on a basis which is substantially proportional to changes in the value of the condition under control, the Bourdon tube 11 is arranged to position the flapper in respect to the nozzle 14. For this purpose, the flapper 15 may consist of a metallic strip having a spring leaf 40 rigidly secured thereto near one end thereof. The flapper 15 is mounted on a fixed pivot pin 41 secured to a suitable post 42 which may be integral with the back plate 10. The position of the pivot pin 41 in relation to the nozzle 14 is preferably arranged so that when the leaf spring 40 engages the nozzle 14, the longitudinal axis of the leaf spring is substantially normal to the axis of the nozzle. The other end of the flapper 15 rests on a pin 43 which is secured to a pin support 44 at the free end of the Bourdon tube 11, it being understood that the flapper tends to rest on the pin 43 since the discharge of fluid through the nozzle orifice 29 tends to raise the flapper against the pin.

In operation, an increase of pressure in the Bourdon tube 11 causes the pin 43 to rise an amount proportional to the pressure change, thereby rotating the flapper 15 towards the nozzle 14 and providing a proportional increase of pressure in the output pressure pipe 35. In the event that the Bourdon tube 11 is subjected to excessive pressure, beyond its operating range, the leaf spring 40 is adapted to give and prevent injury to the parts. On a decrease in pressure in the Bourdon tube the flapper 15 is permitted to move away from the nozzle 14 and the output pressure is thereby reduced.

As is well known to those skilled in the art, it has been found that the movement required by the flapper in respect to the nozzle is on the order of .005 to .008 inch in order to provide a change in output pressure throughout the operating range of pneumatically actuated devices. In the device herein illustrated, the flapper pivot pin 41 is so mounted in relation to the pin 43, at the free end of the Bourdon tube, and to the nozzle 14, that the mechanical advantage in favor of that portion of the flapper which engages the nozzle is on the order of approximately 2 to 1. Thus the total movement required at the free end of the Bourdon tube in order to vary the output pressure throughout its operating range, is approximately .003 to .004 inch. This is an arrangement commonly employed, since a high degree of sensitivity is thereby afforded, and the flapper responds to extremely minute changes in the value of the condition under control.

It will be understood by those skilled in the art that the initial position of the flapper 15 in relation to the nozzle 14 determines the control setting. In the controller illustrated, an increase in the spacing of the flapper and nozzle provides a corresponding increase in the pressure required by the Bourdon tube 11 to move the flapper into controlling relation with the nozzle. Therefore as the spacing is increased the control setting is raised and vice versa. And in this connection it has also been found that the total movement of the free end of a Bourdon tube throughout its operating range as, for example, a range from 0 p. s. i. to 100 p. s. i., is on the order of ¼". Therefore the means for effecting changes in the control setting throughout the operating range of the tube are restricted to providing for a maximum movement of the free end of the Bourdon tube of approximately ¼". And when it is noted that the total movement required at the free end of the Bourdon tube to actuate the flapper throughout its operating range, around the selected setting established by the setting mechanism, is on the order of .003" to .004", it will be understood that the setting mechanism must be capable of providing almost infinitesimal motions, if accurate results in the setting of the instrument are to be obtained. It should also be noted that in order to establish a setting at the exact value desired, correspondingly large motions for indicating the setting are necessary to enable the operator to visualize the minute motions required at the free end of the Bourdon tube. The control mechanism embodying this invention includes an effective and simple means for providing and coordinating the requisite minute control setting motions with the large motions required for indication purposes.

Having reference to the drawings, the indicator 16 comprises an index arm 9 and a driving arm 51 which are connected by a curved portion 50. The indicator is mounted on a pivot 45, located at one side of the support pivot 25, consisting of a post 47 which is threaded into the boss 27 and is provided with a sleeve 48 to which the indicator is rigidly secured at the inner end of the indicator driving arm 51. The sleeve 48 is rotatably mounted on the post 47 and is retained against axial movement by a cap screw 49 which is arranged to permit the indicator to rotate freely. The index arm 9 is provided with an index 8 which is adapted to cooperate with suitable indicia 46 on the scale 17, and as herein indicated, the indicia may read from "0" at the right end of the scale to "100" at the left end, the mid point in the indicia being identified by "50." The indicia 46 are preferably laid out on an arc having its centre of radius at the pivot 45 and in practice, the length of the arc described by the indicia may be approximately four inches, thereby providing an indication range having a relation to the overall range of movement of the pin 43, at the free end of the Bourdon tube, on the order of 16 to 1. The relative positions of the support pivot 25 and the indicator pivot 45 are such that the pivot 25 is on a line between the pivot 45 and the mid position, labelled "50," on the scale; and the parts are so arranged that when the index 8 is at the mid point on the scale and the Bourdon tube 11 is set to position the flapper 15 at the mid point of the Bourdon tube operating range, the longitudinal axes of the indicator index arm 9 and driving arm 51 are in the same vertical plane, normal to the back plate 10, with the longitudinal axis of the Bourdon tube support plate 12, namely, in the position shown in Fig. 1. The indicator curved portion 50 is adapted to span the support pivot 25 and to provide sufficient clearance to permit the index 8 to travel across the scale indicia 46 without interference from the pivot. At the outer end of the indicator driving arm 51, an offset lip 52 is provided for engagement with the combination control setting and indicating motion producing means 20, now to be described.

The motion producing means 20 comprises a screw stem 55 having a pointed end 56 which is adapted to engage the lip 52 of the indicator, an extension spring 57, having one end attached to a pin 58 on the indicator 16 and the other end connected with a pin 59 on the back plate 10, being provided to maintain the lip 52 normally against the pointed end 56 of the screw stem 55. The screw stem 55 is mounted near one end in an adjustor 60, detachably secured to a bracket 61 which may be integral with the back plate 10, and near the other end is mounted in a block 62 secured to a connector 77 carried by the Bourdon tube support plate 12. The adjustor 60 is preferably cup-shaped and includes a base 63, through which the screw stem 55 is threaded as indicated at 64, and a cylindrical portion 65 into which a bushing 66 is threaded as shown at 67. The bushing 66 is freely received through a suitable opening in the bracket 61 and is provided with a head 68 by which the adjustor may be rigidly clamped to the bracket. Means for turning the screw stem 55 is in the form of a hand knob 70 having a hollow stem 71 which is rotatably mounted in the bushing 66 and is held against axial movement by the head of the knob and by a snap spring 72 which is received in an annular groove 73 in the knob stem and engages the inner end of the bushing 66. The screw stem 55 freely extends into the knob stem 71 and includes a pair of oppositely disposed pins 74 which cooperate with slots 75 in the wall of the knob stem disposed lengthwise thereof, one only of each of said pins and slots being shown. The other end of the screw stem 55 is threaded through the block 62, as indicated at 76, and is in operative connection with the lip 52 of the indicator in the manner described above. The connector 77 to which the block 62 is secured is pivoted at 78 to the Bourdon tube support plate 12. The pivot 78 is preferably on the longitudinal axis of the support plate, at some little distance from the pivot 45 on which the indicator is mounted and is so arranged in relation to the point of engagement of the pointed end 56 of the stem 55 with the lip 52 of the indicator, that the latter is aligned with the axis of the connector pivot 78 when the indicator is at the mid point on the scale 17 and the Bourdon tube support 12 is set to maintain a mid value in the operating range. A tension spring 81 which is secured at one end at 82 to the plate 12 and at the other end to a pin 83, mounted in the back plate 10, serves to eliminate lost motion between the threading of the block 62 and screw 55 and the attendant error in indication which would otherwise result.

The parts just described cooperate to provide minute movements for positioning the Bourdon tube 11 in respect to the nozzle 14, thereby varying the set value at which the flapper 15 is brought into controlling relation with the nozzle, with relatively large movements for indicating the set value as shown by the indicator 16 on the scale 17. The combined motions are effected by providing the threads 64 of the screw stem 55 with a pitch which is different from the pitch of the threads 76, both threads being formed in the same direction, i. e. either right-hand or left-hand threads. The threads 64 which cooperate with corresponding threads in the base 63 of the adjustor, may have a pitch, for example, on the basis of twenty threads to the inch. Thus for every twenty turns of the hand knob 70, the axial movement of the screw stem 55 is one inch, and inasmuch as the pointed end 56 of the screw stem is in engagement with the lip 52 of the indicator, the axial movement of the screw stem is utilized to rotate the index 8 of the indicator across the scale 17. On the other hand, the threads shown at 76 which cooperate with corresponding threads in the block 62, may have a pitch, for example, on the basis of twenty-four threads to the inch. Therefore, while the axial movement of the screw stem 55 is one inch for every 20 turns of the hand knob 70, the axial movement imparted to the block 62 is a fraction only of the axial movement of the screw stem. The ratio of stem movement to block movement may be readily determined from the following formula: where $N_1$ = pitch of adjustor threads
$N_2$ = pitch of block threads then $$\frac{N_2}{N_2 - N_1} = \text{ratio of stem movement to block movement}$$

If it be assumed that $$N_1 = 20 \text{ and } N_2 = 24$$

then $$\frac{24}{24 - 20} = \frac{24}{4} = 6, \text{ or a ratio of stem movement to block movement of 6 to 1}$$

In other words the pitch of the threads of the block divided by the pitch of said block threads minus the pitch of the threads of the adjustor determines the ratio of movement of the stem 55 and indicator 16 to the movement of the block 62 and Bourdon tube support 12. It will be noted that any desired ratio of movement may be obtained by a suitable selection of pitch differential.

In the example hereinabove set forth, the movements of the stem 55 and block 52 are both in the same direction. However it may be convenient to rotate the support 12 and indicator 16 in opposite directions. This may be accomplished by providing a greater pitch for the adjustor threads than for the block threads. Thus if the pitch of the adjustor threads is 24 and of the block threads is 20, under the above formula, the ratio is—

$$\frac{20}{20 - 24} = \frac{20}{-4} = -5$$

By this means, the axial movement of the block is the reverse to that of the stem and the ratio of movement of the stem to the block is 5 to 1.

In the controller illustrated, each turn of the hand knob 70 to the right rotates the indicator 16 and the support plate 12 clockwise, and for each unit of movement imparted to the support 12 by a turn of the screw stem 55, six units of movement are imparted to the driving arm 51 of the indicator 16. And the relative leverage of the indicator 16 and support plate 12 is such that the index 8 travels approximately four inches across the scale indicia 46 while the pivot 43, at the end of the Bourdon tube 11, is moving ¼″, or at a ratio of 16 to 1. Thus the indicia marking may be widely spaced to permit an exact setting to be readily visualized and accurately obtained even though infinitesimal motions are required to initially position the flapper at the exact setting desired.

Means for calibrating the parts to conform with the mid position on the scale is accomplished by the hand knob 70 and the adjustor 60. The screw stem 55 is turned until its pointed end 56 is at the mid line or axis of the support plate 12. The axes of the indicator 16 and support plate are then in the same vertical plane. The head 68 of the bushing 66 is then backed off from the bracket 61, the screw stem 55 is held against rotation by means of the hand knob 70, and the adjustor 60 is turned until the indicator 16, together with the support plate 12, is at the mid point of the range of adjustment, herein indicated at point "50" on the scale. The adjustor is then reclamped to the bracket 61 and the hand knob 70 is turned to position the indicator at any selected value within the range of adjustment shown on the scale.

While I have described in detail a preferred embodiment of my invention, it will be understood that various embodiments may be employed.

What I claim as new and desire to secure by Letters Patent of the United States is:

1. In a pneumatic controller wherein a condition value setting indicator requires relatively large indicating movements and a condition value responsive element requires relatively minute setting movements, means for simultaneously effecting said respective movements, comprising, a rotatable screw having a threaded connection with a fixed bracket, a movably mounted support for said condition value responsive element, a connector operatively attached to said support having a threaded connection with said screw, both of said connections being threaded in the same direction, the pitch of the threads of one of said connections being different from the pitch of the threads of the other of said connections, to provide a motion to said connector axially of the screw, when the screw is rotated, which is the algebraic sum of the axial motion of the screw in reference to the bracket and the axial motion of the connector in reference to the screw, and means connecting said screw and said indicator for actuating the indicator from the axial motion of the screw with respect to said fixed bracket.

2. In a pneumatic controller wherein a condition value setting indicator requires relatively large indicating movements and a condition value responsive element requires relatively minute setting movements, means for simultaneously effecting said respective movements, comprising a rotatable screw having a threaded connection with a fixed mounting, a pivoted support for said condition value responsive element, a connector pivotally attached to said support having a threaded connection with said screw, both of said connections being threaded in the same direction, the pitch of the threads of one of said connections being different from the pitch of the threads of the other of said connections, to provide a motion to said connector axially of the screw, when the screw is rotated, which is the algebraic sum of the axial motion of the screw in reference to the fixed mounting and the axial motion of the connector in reference to the screw, and means connecting said screw and indicator for actuating the indicator from the axial motion of the screw with respect to said fixed mounting.

3. In a pneumatic controller wherein a condition value setting indicator requires relatively large indicating movements and a condition value responsive element requires relatively minute setting movements, means for simultaneously effecting said respective movements, comprising, a fixed mounting, a rotatable screw having a threaded portion cooperating with a corresponding threaded portion associated with said mounting, a pivotal support for said condition value responsive element, a connector including an arm pivotally attached to said support having a threaded member at one side thereof, said screw having a second threaded portion cooperating with the threads of said threaded member and extending through said member at one side of said connector arm into operative engagement with said indicator, both of said portions being threaded in the same direction, the pitch of the threads of one of said portions being different from the pitch of the threads of the other of said portions, to provide a motion to said indicator corresponding to the axial motion of said screw in reference to said mounting when the screw is rotated, and a motion to said connector axially of the screw, which last mentioned motion is the algebraic sum of the axial motion of said screw and of the axial motion of said threaded connector member in reference to the screw.

4. In a pneumatic controller wherein a condition value setting indicator requires relatively large indicating movements and a condition value responsive element requires relatively minute setting movements, means for simultaneously effecting said respective movements, comprising, a pivotally mounted support plate for said element, a connector including an arm pivotally attached to said plate, and a threaded member secured to said arm at one side thereof, a rotatable screw stem, a fixed mounting having a threaded portion associated therewith cooperating with a first threaded portion on said screw stem, said screw stem having a second threaded portion cooperating with the threads of said connector member and extending through said member at one side of said connector arm into operative engagement with said indicator, both of said portions being threaded in the same direction, and the pitch of the threads of one of said portions being different from the pitch of the threads of the other portion, to provide a motion to said indicator, when said screw stem is rotated, corresponding to the axial motion of the screw stem in reference to said mounting, and a motion to said connector in reference to said mounting, which last mentioned motion is the algebraic sum of the axial motion of the screw stem and the axial motion of the connector member in reference to the screw stem.

5. In a pneumatic controller wherein a condition value setting indicator cooperating with a scale requires relatively large indicating movements and a condition value responsive element requires relatively minute setting movements, means for simultaneously effecting said respective movements, comprising a pivotally mounted support plate for said element, said indicator being pivotally mounted at one side of said plate and including an index arm in cooperative relation with said scale and a driving arm, a connector pivotally attached to said plate including an arm having a threaded member secured thereto at one side thereof, a fixed mounting, a rotatable screw stem having a threaded portion cooperating with a corresponding threaded portion associated with said mounting, said stem having a second threaded portion cooperating with the threads of said connector member and extending through said member into engagement with the driving arm of said indicator, both of said portions being threaded in the same direction, the pitch of the threads of one of said portions being different from the pitch of the threads of the other portion, to impart a motion to said plate, when said screw stem is rotated, which motion is the algebraic sum of the axial motion of said screw stem in reference to said mounting and of the axial motion of said connector member in reference to said screw stem, and yielding means normally retaining said indicator driving arm in engagement with said screw stem, whereby said indicator is actuated on a basis which corresponds to the axial motion of said screw stem in reference to said mounting.

6. In a pneumatic controller wherein a condition value setting indicator cooperating with a scale requires relatively large indicating movements and a condition value responsive element requires relatively minute setting movements, means for simultaneously effecting said respective movements, comprising a pivotally mounted support on which said element is mounted, said indicator being pivotally mounted adjacent said support and in cooperative relation with said scale, a fixed bracket, an adjustor associated with said bracket and detachably clamped thereto, a connector in operative relation with said support, a rotatable screw stem having a first threaded connection with said adjustor and a second threaded connection with said connector, both of said connections being threaded in the same direction, the pitch of the threads of one of said connections being different from the pitch of the threads of the other connection, to impart motion to said support, when said screw stem is rotated, which motion is the algebraic sum of the axial motion of said screw stem in reference to said adjustor and of the axial motion of said connector in reference to said screw stem, and means operatively connecting said indicator and screw stem for actuating said indicator from the axial movement of the screw stem, said adjustor being rotatable when detached from said bracket to vary the axial position of said screw stem in reference to the bracket.

7. In a pneumatic controller wherein a condition value setting indicator cooperating with a scale requires relatively large indicating movements and a condition value responsive element requires relatively minute setting movements, means for simultaneously effecting said respective movements, comprising a pivotally mounted support for said element, said indicator being pivotally mounted, a connector pivotally attached to said support including an arm having a threaded member secured thereto at one side thereof, a fixed mounting, a rotatable screw stem having a pointed end in engagement with said indicator at one side of its pivotal mounting, said stem having a threaded portion cooperating with a corresponding threaded portion associated with said mounting and having a second threaded portion cooperating with the threads of said connector member, both of said portions being threaded in the same direction, the pitch of the threads of one of said portions being different from the pitch of the threads of the other portion, to impart a motion to said plate, when said screw stem is rotated, which motion is the algebraic sum of the axial motion of said screw stem in reference to said mounting and of the axial motion of said connector member in reference to said screw stem, and yielding means normally retaining said indicator in engagement with the pointed end of said screw stem, whereby said indicator is actuated on a basis which corresponds to the axial motion of said screw stem in reference to said mounting.

JOHN W. ROBINS.

REFERENCES CITED

The following references are of record in the file of this patent:

UNITED STATES PATENTS

| Number | Name | Date |
| --- | --- | --- |
| 1,138,082 | Carrier | May 4, 1915 |
| 1,430,853 | Roesch | Oct. 3, 1922 |
| 1,464,907 | Ireland | Aug. 14, 1923 |
| 1,805,971 | Bristol | May 19, 1931 |
| 2,047,581 | Grissett | July 14, 1936 |
| 2,283,296 | Temple | May 19, 1942 |